Nov. 10, 1936. R. SARBER 2,060,695
OPERATING DEVICE FOR DIRECTION INDICATING APPLIANCES
Filed Jan. 23, 1935
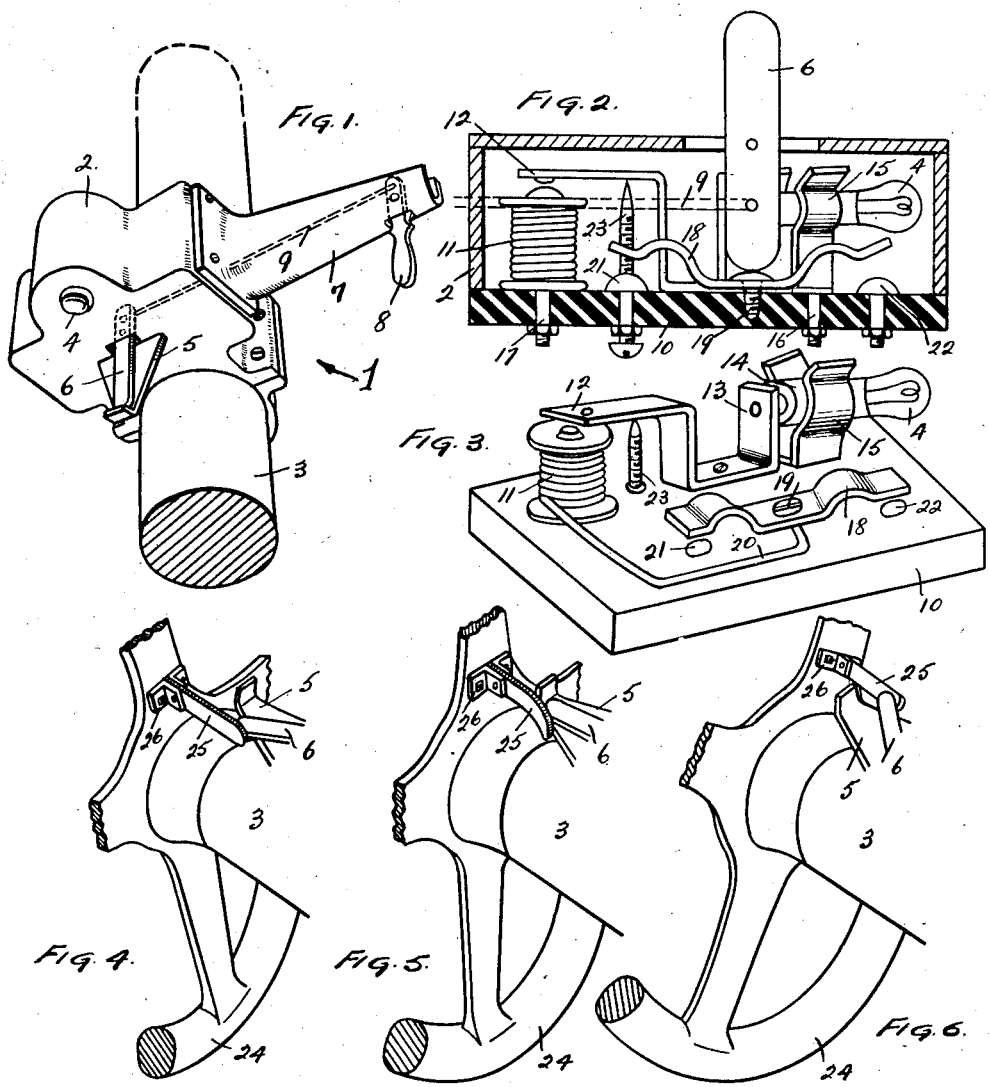
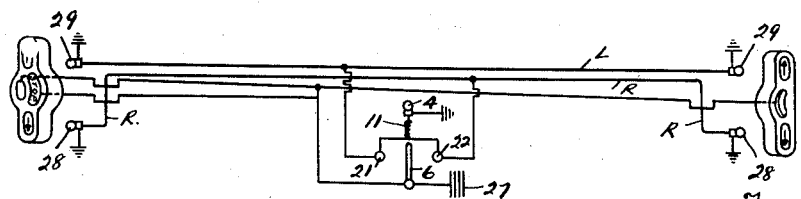
Inventor
RAE SARBER
By Albert F. Dieterich
Attorney Patented Nov. 10, 1936

2,060,695

UNITED STATES PATENT OFFICE 2,060,695

OPERATING DEVICE FOR DIRECTION INDICATING APPLIANCES

Rae Sarber, Vancouver, British Columbia, Canada

Application January 23, 1935, Serial No. 3,126

2 Claims. (Cl. 200—59)

This invention relates to a manually operated and automatically released switch mechanism used in combination with electrically operated direction indicating apparatus as used upon automobiles. My invention is specifically designed as an improvement upon a previous patent application for which I was granted United States Patent No. 1,572,314 on February 9, 1926.

It is one of the objects of my present invention to improve upon such types of direction indicating mechanisms and provide means whereby such mechanisms resume their normal "off" position automatically after the direction or turn for which the mechanism was originally set to indicate has been completed without further manual operation.

It is a further object of my invention to provide a simple, sturdy and conveniently operated mechanism that can be applied to all types of cars upon which direction indicating apparatus can be applied.

With these and other objects in view I have invented the switch setting and control device for direction indicating apparatus of automobiles which forms the subject matter of this application and which is further described in the following specification and illustrated in the accompanying drawing, and in which:

Figure 1 is a perspective view of the operating device positioned upon the steering arm and shows the manually operated setting lever by which the lights are selected for the direction indicating mechanism of the car in the neutral or "off" position.

Figure 2 is a diagrammatic view of the main body of the operating mechanism, this being in the nature of a circuit maker, and shows the magnetic coil by which the circuit to the pilot light is made. The pivoted switch lever is shown in the neutral position between the spring contacts for closing the right and left hand circuits.

Figure 3 is a perspective view of the base of the operating mechanism removed from its housing to more clearly show the positioning of the parts.

Figure 4 is a fragmentary view of the steering wheel showing the wiper contact positioned on the underside of the wheel making contact with the switch lever preparatory to positioning it in the neutral position.

Figure 5 is a similar view to Figure 4 but shows the steering wheel wiper contact in more advanced position and about to position the switch lever in the neutral position under its guard.

Figure 6 is a view somewhat similar to Figures 4 and 5 but shows the steering wheel and the wiper contact being moved in a direction opposite to that shown in Figures 4 and 5 to position the switch lever in the neutral position after being set for a direction opposite to that illustrated in the previous two figures.

Figure 7 is a diagrammatic view of the circuits used in connection with the direction indicating mechanism but does not include the usual headlight circuits found in all automobiles.

In the drawing like numerals indicate like parts, and the numeral 1 indicates an operating mechanism generally housed within a casing 2 adapted for clamping on a steering post 3 of an automobile.

On the upper and face side of the casing 2 is positioned a pilot light 4 to indicate to the driver if the circuits selected are operating or not.

Immediately below the pilot light 4 and adjacent the steering post 3 is positioned a guard member 5 adapted to cover a switch lever 6 which is pivoted within the casing 2.

On one side of the casing 2 is secured an extension arm 7, in the outer end of which is pivoted the manually operated switch lever 8 which is connected by a rod 9 (indicated in dotted lines in Figure 1) with the switch lever 6, whereby the two are moved in unison.

Housed within the casing 2 is a circuit closure and selecting mechanism comprising an insulated base 10 upon which is mounted a magnet coil 11 having a magnetic contact 12 bent into the form of a U loop at its opposite end, the vertical portion 13 of which forms a contact to the base 14 of the miniature pilot light 4 which is held in the clip 15 secured upon the base 10 by the terminal contact screw 16 which forms a terminal upon the back of the base 10.

The magnetic coil 11 is likewise secured to the base 10 by the terminal screw 17.

Positioned adjacent the afore-described parts is a dual spring contact 18 secured to the base 10 by the screw 19, which also forms a terminal connection to one end of the winding 20 of the magnet coil 11.

Positioned immediately below the outer ends of the dual contact 18 are contact terminals 21 and 22 which form terminals upon the back of the base 10 also.

Positioned intermediate the magnet coil 11 and the U loop of the magnetic contact 12 is an adjusting screw 23 which is operable from the back of the base 10 for the purpose of adjusting the magnetic contact 12 for controlling the closing of the circuit to the pilot light 4.

The dual contact 18 is operable by the inner end of the pivoted switch lever 6 carried by the outer casing 2, which in turn is manually operated by the switch lever 8 mounted in the end of the extension arm 7 through the rod 9, as previously referred to.

Secured upon the underside of the steering wheel 24 is a wiper contact finger 25 secured by the clamps 26 to one of the spokes of the wheel 24, the purpose of which is to act upon the outer end of the switch lever 6 to position it under the guard 5 by the action of the wheel 24 to obliterate any signals previously set.

In use, it is assumed that an automobile is equipped with front and rear direction indicating apparatus, such as is diagrammatically suggested in Figure 7, wherein the front fixture has right and left indicating indicia and a central aperture for illuminating the license plate, and the rear fixture has also right and left indicating indicia, besides the usual tail and stop light signals.

Assuming the manual operating switch lever 8 is in the vertical or neutral position, as illustrated in Figure 3, then no signals are displayed upon the indicating mechanism at the front and rear of the car, or upon the pilot light 4 as the only lights that will be in operation are the usual tail and stop lights and the license plate illuminating light at the front of the car which are under control of the usual standard lighting circuits of the car.

If it is desired to make a right turn, the operating lever 8 is positioned to the right, which will place the switch lever 6 in the position indicated in Figure 4 and close the circuits from the battery 27 through the switch lever 6 upon the contact terminal 22 and one side of the dual contact 18 and through the lamps 28.

Immediately a current flow is set up through the mechanism 1, a part is shunted through the magnet coil 11 which closes the contact 12 and delivers current to the base 14 of the pilot light 4 and through the clip 15 and terminal 16 to ground, thereby illuminating the pilot light 4.

After setting the indicating apparatus to display a right turn, the driver has no further attention to pay to the signal, for immediately he has completed the right turn and turns the steering wheel 24 to resume a straight ahead direction, the wheel 24, through that operation, has obliterated the right turn signal previously set by the action of the wiper finger 25 having positioned the switch lever 6 under its guard 5 into the neutral or "off" position.

If the operating lever 8 is set to display a left hand turn, then the current flows from the battery 27 through the switch lever 6, dual contact 18 and terminal 21 into the left hand circuit of the lamps 29.

It is to be noted that the pilot light 4 cannot be illuminated except when a current flow is set up in the mechanism 1 as it is not in circuit with the ordinary circuits of the car but is only energised by operation of the indicating mechanism in circuit with the signal displaying apparatus of the automobile.

The guard member 5 protects the lever 6 from movement when positioned thereunder and movement of the steering wheel 24 during all ordinary car operations in no way affects or acts upon the lever 6, except when the latter is set to display a signal and is, therefore, removed from under the guard member 5 by the action of the pivoted lever 8.

Having now described my invention and the nature of same, what I claim and desire to be protected in by Letters Patent, is:

1. In automobile direction signalling apparatus of the type which employs a circuit closing switch located on the steering post, and means on the steering wheel to cooperate with the switch to set it in its "off" position upon turning of the wheel; a circuit closing switch device including a casing adapted to be secured to the steering post of an automobile, a switch lever projecting from said casing, a guard member for said switch lever when in the "off" position, a side extension to said casing having a pivoted lever in the outer end thereof, a rod member housed in said extension and connecting said pivoted lever and switch lever together whereby on movement of said pivoted lever said switch lever will be moved to its "on" or circuit closing positions.

2. In a switch device for automobile direction signals, a casing securable to the steering post of an automobile, a pivoted switch lever in said casing having its upper end projecting from said casing, a guard member secured upon the upper face of said casing and adapted to cover the projecting end of said switch lever when in the "off" position, an extension member to said casing, an operating lever pivoted in said extension member, a rod member connecting said operating lever with said switch lever whereby the switch lever may be manually moved to its circuit closing positions out of alignment with said guard member for the purposes described.

RAE SARBER.